United States Patent [19]

Kohno et al.

[11] Patent Number: 5,054,532
[45] Date of Patent: Oct. 8, 1991

[54] PNEUMATIC TIRES WITH WAVY OR ZIGZAG CORD PLY BETWEEN BELT AND CARCASS

[75] Inventors: Yoshihide Kohno, Kodaira; Yasuhiko Kobayashi, Hachioji; Kiyoshi Sato; Hiroyuki Koseki, both of Kodaira, all of Japan

[73] Assignee: Bridgestone Corporation, Tokyo, Japan

[21] Appl. No.: 460,787

[22] Filed: Jan. 4, 1990

[30] Foreign Application Priority Data

Feb. 6, 1989 [JP] Japan ................................ 1-25636
Mar. 9, 1989 [JP] Japan ................................ 1-54978

[51] Int. Cl.$^5$ .......................... B60C 9/18; B60C 9/00; B60C 9/02
[52] U.S. Cl. .................................... 152/527; 152/531
[58] Field of Search ............... 152/451, 527, 556, 526, 152/531, 538; 57/902

[56] References Cited

U.S. PATENT DOCUMENTS 3,217,778 11/1965 Kovac et al. ...................... 152/556
3,979,536 9/1976 Neville et al. ................... 152/527 X
4,219,601 8/1980 Inoue et al. ...................... 152/527 X
5,004,031 4/1991 Kadota et al. .................... 152/531 X

FOREIGN PATENT DOCUMENTS 0332449 9/1989 European Pat. Off. .
2165810 8/1973 France .
2501126 9/1982 France .
54-126306 10/1979 Japan .
55-132307 10/1980 Japan .
57-209403 12/1982 Japan .
81371 6/1979 Luxembourg .
0815055 6/1959 United Kingdom ............... 152/531

OTHER PUBLICATIONS

*Mechanics of Pneumatic Tires*, Ed. Samuel Clark: U.S. Dept. of Transportation, Aug. 1981, p. 131.

*Primary Examiner*—Michael W. Ball
*Assistant Examiner*—Adrienne C. Johnstone
*Attorney, Agent, or Firm*—Sughrue, Mion, Zinn, Macpeak & Seas

[57] ABSTRACT

A crown portion of a pneumatic tire comprising at least one radial carcass ply and a belt of at least two cross belt layers is reinforced by arranging a strip containing wavy or zigzag-like cords or filaments between the carcass ply and the belt as a crown reinforcing layer.

3 Claims, 5 Drawing Sheets

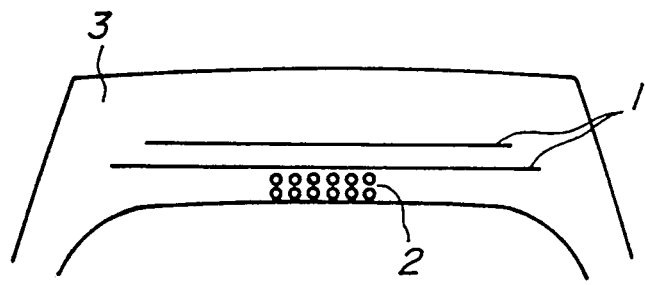
FIG_1a
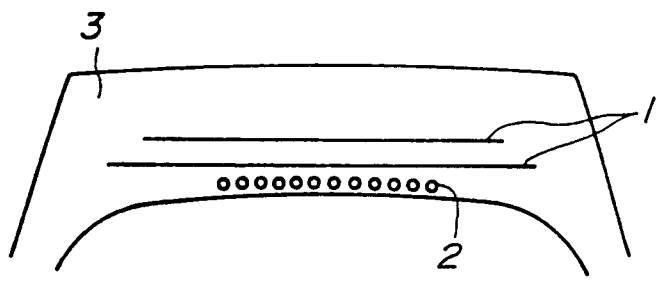
FIG_1b
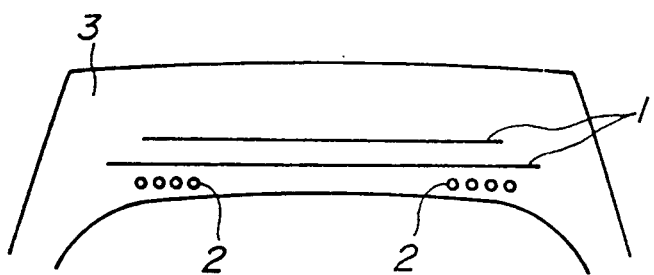
FIG_1c
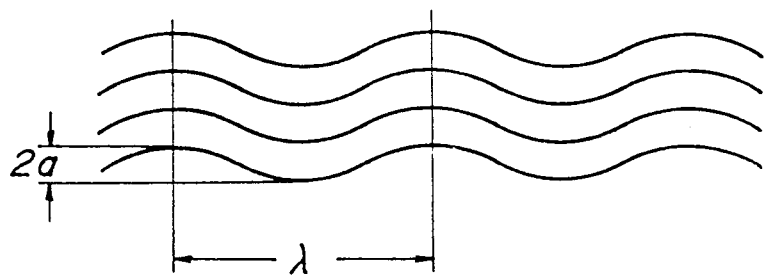
FIG_2

FIG_3a
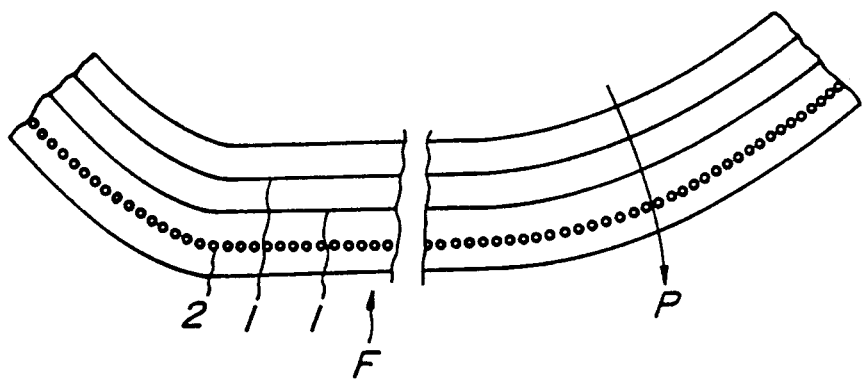
FIG_3b
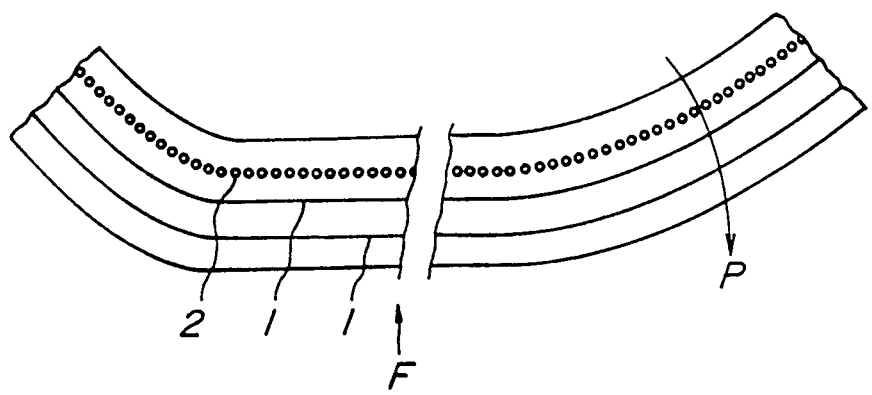

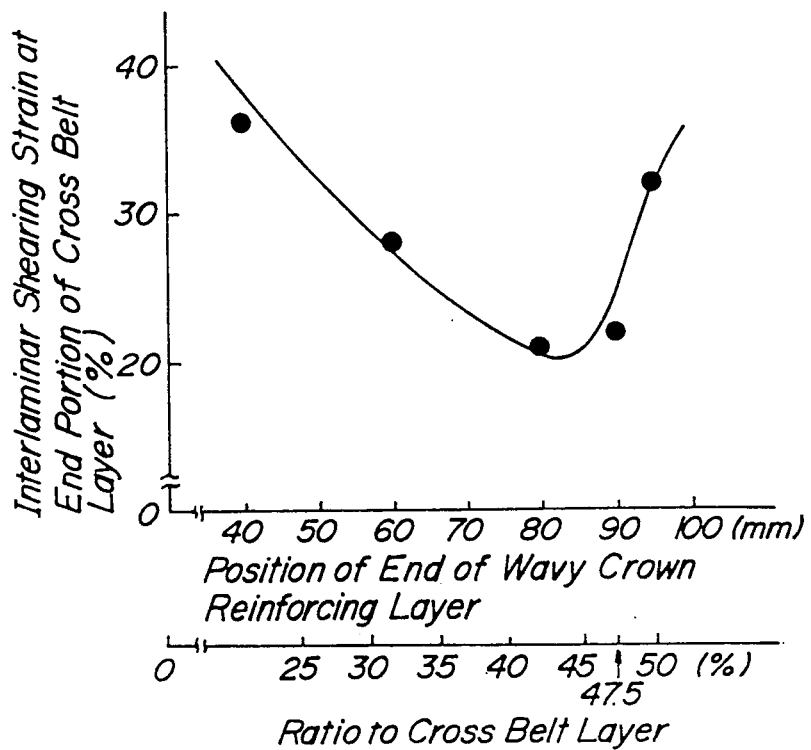
FIG._4
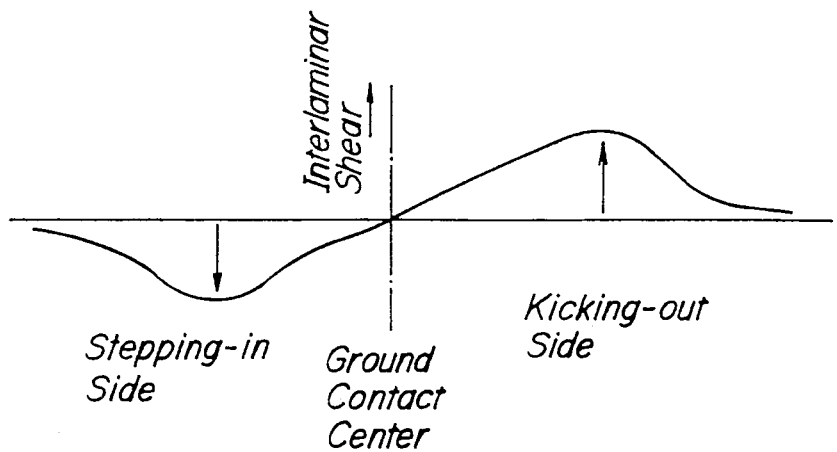
FIG._5

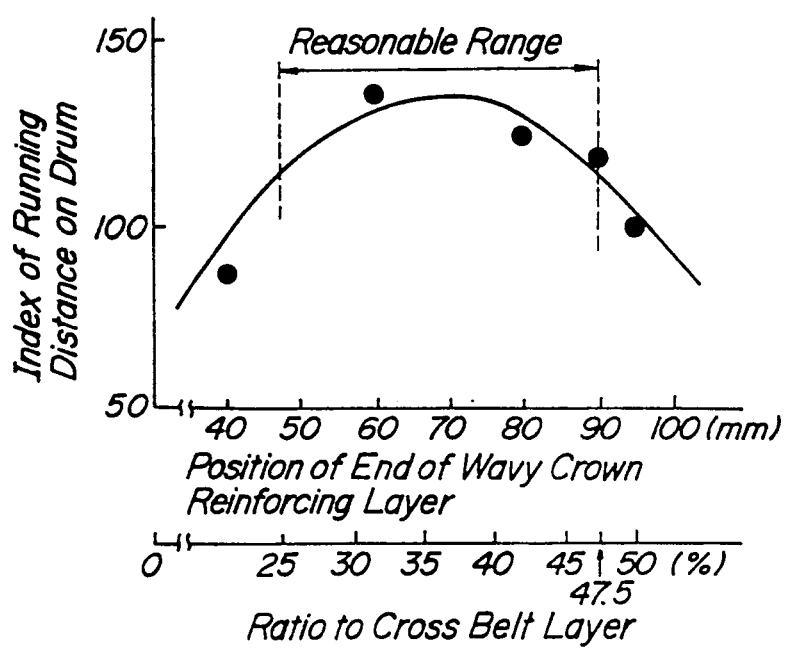
FIG_6

PNEUMATIC TIRES WITH WAVY OR ZIGZAG CORD PLY BETWEEN BELT AND CARCASS

BACKGROUND OF THE INVENTION

1. Field of the Invention

This invention relates to pneumatic tires, and more particularly to an improvement in an effective reinforcement of a crown portion in the tire.

2. Related Art Statement

In general, the crown portion of the pneumatic tire has exclusively been reinforced by a belt comprised of at least two belt layers, which can not still emerge from problems such as separation failure and the like.

In this connection, Japanese Patent laid open Nos. 54-126306 and 55-132307 disclose that circumferential tension is born by a laminated assembly of cord layers called a limit block or limit assembly to mitigate the circumferential tension acting to the belt, resulting in the prevention of separation failure. In fact, however, there is a fear of causing separation failure between the limit blocks because it is required to laminate cord layers, whose cords are crossed with each other at a very shallow inclination angle with respect to the equator of the tire in order to obtain a high rigidity along the circumference of the tire.

On the other hand, the separation failure can be avoided by using a cord strip having a cord angle of 0° instead of the limit block because the cut free end of the cord is not formed in case of using the strip. However, when using such a strip, the enlargement of the belt in circumferential direction is suppressed in a vulcanizer for green tire, which causes the serious difficulty in the manufacture of tires. Moreover, the twisting of the cord used as a reinforcing element for the strip having a cord angle of 0° is possible to have a structure that it easily elongates only at the initial curing stage and provides a given rigidity after curing. In such a cord, however, the twisting pitch becomes short, which is disadvantageous in view of the productivity, and the cord strength is lowered due to the twisting, so that it is obliged to increase the end count in the strip considering a fear of so-called cut burst in the tire, resulting in the increase of tire weight. Furthermore, it is impossible to use a monofilament as a cord material.

Japanese Patent laid open No. 57-209403 discloses a technique for reinforcing a tire with a protect layer comprised of wavy cords, wherein a wavy body composed of fibers or metal cords having an extremely low elongation is arranged as a protect layer in addition to a breaker comprised of at least two layers. However, there is no description on the effect of the protect layer as a crown reinforcing layer in this technique.

SUMMARY OF THE INVENTION

It is, therefore, an object of the invention to provide a pneumatic tire having a reinforcing means for tire crown portion in which the separation failure at cross cord belt and crown reinforcing layer serving to reinforce the crown portion of the tire is advantageously prevented by using usual cords or filaments with simplification of tire manufacture and without increasing the tire weight.

According to the invention, there is the provision of a pneumatic tire comprising at least one radial carcass ply toroidally extending between a pair of bead portions and a belt reinforcing a tread on said radial carcass, said belt being comprised of at least two cross belt layers each containing cords or filaments as a reinforcing element and crossed with each other at an inclination cord angle of 10°–40° with respect to an equator of the tire and at least one crown reinforcing layer disposed between said carcass ply and said cross belt layer, characterized in that said crown reinforcing layer is comprised of a strip containing undulating, i.e. wavy or zigzag cords or filaments arranged substantially in parallel with the equator of the tire as a reinforcing element.

In a preferred embodiment of the invention, the strip has a ratio of amplitude (a) to wavelength ($\lambda$) in the wavy or zigzag reinforcing element of 0.015–0.06.

In another preferred embodiment of the invention, the crown reinforcing layer is arranged so that a distance from the outer end in widthwise direction of the strip to the equatorial plane of the tire is within a range of 25–47.5% of a maximum width of an actually overlapped region in the cross belt layers.

In the other preferred embodiment of the invention, the crown reinforcing layer is arranged so that a ratio M defined by the following equation is within a range of 0.25–1.0:

$$M = \frac{\sum_{n=1}^{m_W} E_{Wn} \cdot A_{Wn} \cdot N_{Wn}}{\sum_{n=1}^{m_B} E_{Bn} \cdot A_{Bn} \cdot N_{Bn}}$$

wherein $m_W$: total strip number,
$m_B$: total cross belt layer number,
$E_{Wn}$: elastic modulus of reinforcing element in nth strip,
$E_{Bn}$: elastic modulus of reinforcing element in nth cross belt layer,
$A_{Wn}$: sectional area of reinforcing element in nth strip,
$A_{Bn}$: sectional area of reinforcing element in nth cross belt layer,
$N_{Wn}$: end count (cords/50 mm) in nth strip,
$N_{Bn}$: end count (cords/50 mm) in nth cross belt layer.

BRIEF DESCRIPTION OF THE DRAWINGS

The invention will be described with reference to the accompanying drawings, wherein:

FIGS. 1a to 1c are schematically sectional views of a main part of the tire according to the invention, respectively;

FIG. 2 is a schematic view of wavy reinforcing element used in the invention;

FIGS. 3a and 3b are schematically sectional views in parallel with the equator of the tire illustrating a deformation behavior of tread portion, respectively;

FIG. 4 is a graph showing an influence of a position of an end of the crown reinforcing layer upon interlaminar shearing strain at an end of the cross belt layer;

FIG. 5 is a view showing a distribution of interlaminar shearing strain accompanied with the deformation of the tread under loading;

FIG. 6 is a graph showing a relation between the position of an end of the crown reinforcing layer and the running distance on a drum.

DESCRIPTION OF THE PREFERRED EMBODIMENTS

Figure 7:
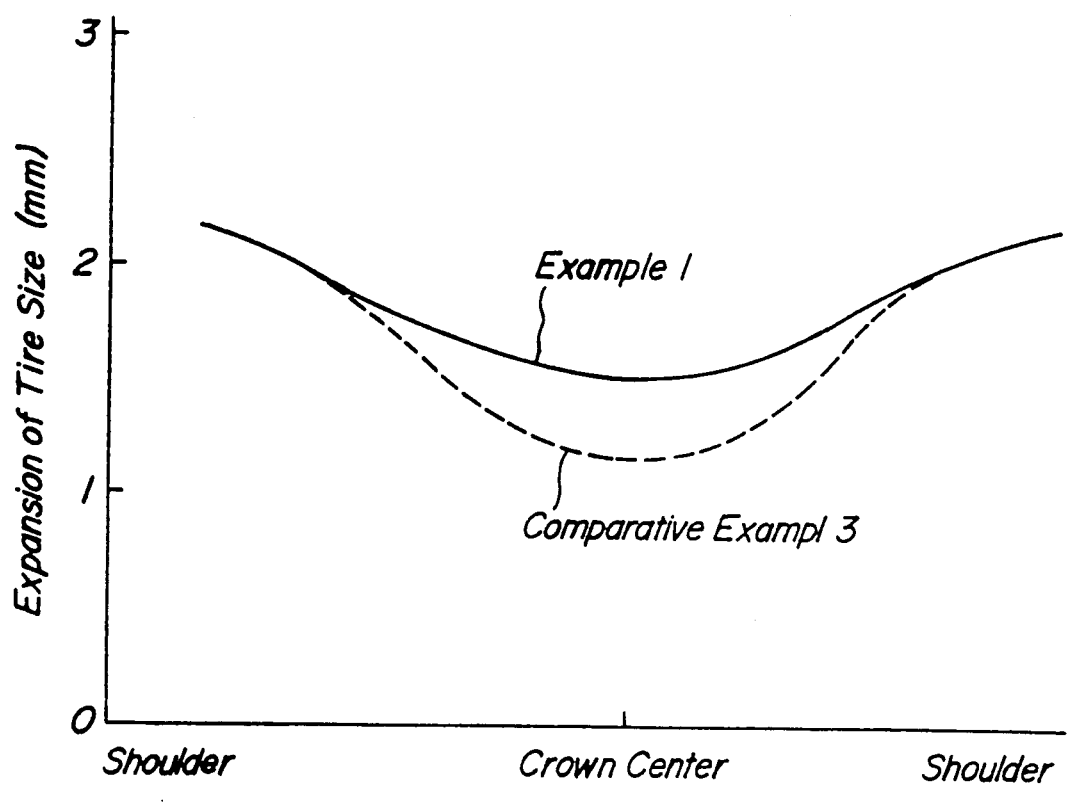
FIG. 7 is a graph showing a comparison in the expansion of tire size between Example 1 and Comparative Example 3.

According to the invention, the strip containing wavy or zigzag cords or filaments arranged as a reinforcing element along the equator of the tire is used as the crown reinforcing layer. Thus, the elongation is easily obtained in the vulcanization by using such a strip, so that the tire production becomes more convenient. Particularly, it is not required to control the elongation by a twisting means or the like, so that low cost filaments may be used. Furthermore, there is no fear of reducing the strength of cord due to the twisting, so that cord burst is not caused and the tire weight is not increased.

In FIGS. 1a to 1c are schematically shown a main part, particularly tread portion of the pneumatic tire according to the invention, respectively, in which the illustration of toroidal carcass ply and bead core is omitted together with sidewall portion and bead portion for convenience' sake.

In FIG. 1, numeral 1 is a cross belt layer, numeral 2 a crown reinforcing layer, and numeral 3 a tread rubber.

As is well-known, each of the cross belt layers 1 is a so-called tire cord fabric obtained by arranging usual cords or filaments each made from organic fiber, metal or the like, particularly steel wire in parallel with each other as a reinforcing element, coating with rubber, slantly cutting the resulting rubberized body and rebonding the cut pieces at their cut ends with each other. According to the invention, at least two cross belt layers 1 are laminated one upon the other about the crown portion of the carcass ply so as to cross the cords of these layers with each other at an inclination angle of 10°-40° with respect to the equatorial plane.

The crown reinforcing layer 2 is comprised of a strip extending across the equator toward both sides in widthwise direction (see FIGS. 1a and 1b) or a pair of strips arranged only on both sides of the crown portion (see FIG. 1c). Moreover, at least one strip is used as shown in FIGS. 1a and 1b. In any case, the crown reinforcing layer 2 is disposed beneath the cross belt layer 1 and above the crown portion of the carcass ply.

In the manufacture of such tires, various parts constituting the tire are combined to form a green tire, which is vulcanized in a vulcanizer. Moreover, the size of the tire during the change of from the green tire to the final tire product is expanded by 2-6%. Therefore, the reinforcing element constituting the strip of the crown reinforcing layer 2 should be substantially arranged in parallel to the equator of the tire from a viewpoint of the durability, so that it is required to elongate in accordance with the expansion degree of tire size of 2-6% at the vulcanization step. If the reinforcing element is not extensible, the sectional shape of the tire product becomes distorted and the tire can not be put into practical use. For this end, the reinforcing element used in the crown reinforcing layer 2 is necessary to have an elongation at breakage larger than the above expansion degree in the vulcanization.

According to the invention, the strip constituting the crown reinforcing layer 2 contains cords or filaments made from organic fiber or metal, particularly steel wire as a reinforcing element. Such a reinforcing element is very small in the extensibility and is previously formed into a wavy or zigzag shape as shown in FIG. 2, wherein a ratio $(a/\lambda)$ of amplitude $a$ to wavelength $\lambda$ is within a range of 0.015-0.06. These wavy (or zigzag) reinforcing elements are wholly arranged along the equator of the tire in the strip. Moreover, in order to obtain the ratio $a/\lambda$ of the above range after the vulcanization, the reinforcing elements having a ratio $a/\lambda$ larger than that after the vulcanization are used to form a strip, which is attached onto the carcass ply in the green tire. The expansion in the size of the green tire inside the vulcanizer may be allowed by such a forming of the reinforcing element, so that the ratio $a/\lambda$ after the vulcanization is made smaller than that of the green tire and becomes substantially inextensible along the equator of the tire.

The crown reinforcing layer 2 is used so that a ratio M defined by the following equation is within a range of 0.25-1.0:

$$M = \frac{\sum_{n=1}^{m_W} E_{Wn} \cdot A_{Wn} \cdot N_{Wn}}{\sum_{n=1}^{m_B} E_{Bn} \cdot A_{Bn} \cdot N_{Bn}}$$

wherein $m_w$ : total strip number,
$m_B$ : total cross belt layer number,
$E_{Wn}$ : elastic modulus of reinforcing element in nth strip,
$E_{Bn}$ : elastic modulus of reinforcing element in nth cross belt layer,
$A_{Wn}$ : sectional area of reinforcing element in nth strip,
$A_{Bn}$ : sectional area of reinforcing element in nth cross belt layer,
$N_{Wn}$ : end count (cords/50 mm) in nth strip,
$N_{Bn}$ : end count (cords/50 mm) in nth cross belt layer.

Since tension under an inflation of internal pressure after the vulcanization is born by the strip together with the cross belt layers 1 to mitigate the tension of the belt, the crown reinforcing layer 2 prevents the occurrence of separation failure at the cross belt layers. For this purpose, it is preferable that the ratio $a/\lambda$ is not more than 0.06 and the ratio M is not less than 0.25. Particularly, the ratio $a/\lambda$ should be within a range of 0.015-0.06 and the ratio M should be within a range of 0.25-1.0.

When the tension bearing of the crown reinforcing layer 2 becomes too large, if the ratio M exceeds 1.0, the rigidity of only the strip becomes too large and the expansion of the tire size becomes ununiform in the widthwise direction of the tire, and consequently uniform wearing can not be expected, so that the ratio M should be limited to 1.0.

Furthermore, the lower limit of the ratio $a/\lambda$ should be 0.015 in order to permit the expansion of the size of the green tire in the vulcanizer. Because, if it is intended to obtain the ratio $a/\lambda$ of less than 0.015 after vulcanization, the size expansion of the green tire in the vulcanizer is not allowed and waving is caused in the belt layer in the widthwise direction thereof, and consequently the given object can not be achieved.

Japanese Patent laid open No. 57-209403 discloses the use of the strip containing wavy cords as a protect layer for the belt, wherein the strip is arranged on each side of the belt outward in the radial direction of the tire or between the belt layers. As shown in FIG. 3a, when the strip as a protect layer 2' is arranged outside the cross belt layers 1 in the radial direction of the tire, the circumferential length of the cross belt layer 1 is shorter than that of the protect layer 2'. In FIG. 3a, a left half portion shows a deformation state of the tire in the ground contact during the running under a load, and a right half portion shows a free state. Further, since the circumferential length of the protect layer 2' is substantially unchanged even through the deformation in the ground contacting, when the entirely of the cross belt layers 1 and the protect layer 2' is changed into a flat form shown by an arrow F through a bending force shown by an arrow P during contact with ground, the cross belt layers 1 are elongated by the protect layer 2'.

On the other hand, when the strip is arranged as a crown reinforcing layer 2 inside the cross belt layers 1 and outside the crown portion of the carcass ply in the radial direction of the tire as shown in FIG. 3b, even if the cross belt layers 1 and the crown reinforcing layer 2 are changed into a flat form F through the bending force P, the cross belt layers 1 located outside the crown reinforcing layer 2 are compressed by the crown reinforcing layer 2.

Thus, in this invention, compression force is given to both end portions in widthwise direction of the cross belt layers 1 located outside the crown reinforcing layer 2, whereby the shearing force is further suppressed at the belt end.

Furthermore, the strip constituting the crown reinforcing layer 2 according to the invention contains wavy or zigzag cords or filaments as a reinforcing element, so that there is no fear of causing separation failure from the side end of the strip because the cut ends of cords as in the cross belt layer are not existent in the end of the strip and the so-called strain concentration is not caused.

In this invention, it is preferable that the distance of the crown reinforcing layer 2 ranging from the outer end in widthwise direction of the layer 2 to a position of the equator is within a range of 25-47.5% of the maximum width of actually overlapped region between the cross belt layers 1.

FIG. 4 illustrates results on shearing strain measured at the ends of the cross belt layers 1 along the circumference of the tire. Such a shearing strain results in the occurrence of separation failure from the end of the cross belt layer as mentioned above.

When the position of the end of the crown reinforcing layer 2 coincides with the position of outer end of the overlapped region (corresponding to a position of 50% in FIG. 4), the strain at the end of the cross belt layer becomes large. Further, when the end position of the crown reinforcing layer is shifted inward in the widthwise direction, the strain at the end of the cross belt layer is minimum at once and tends to gradually increase.

In addition that the separation failure is caused due to the above large shearing strain at the end of the cross belt layer, it is necessary to consider the heat build-up through the crown reinforcing layer 2.

Since the crown reinforcing layer 2 is substantially inextensible along the equator of the tire, when the cross belt layers 1 and at least one crown reinforcing layer 2 are used, the shearing strain along the circumference of the tire is caused between these layers at kicking-out side and stepping-in side. This is shown in FIG. 5 when the tread is deformed during the contacting with ground as shown in FIG. 3.

Therefore, it is necessary to consider the heat build-up at the wavy crown reinforcing layer due to such a strain. As the width of the crown reinforcing layer 2 becomes wide, the heat build-up increases, which is disadvantageous in the prevention of separation failure at the end of the cross belt layer 2. On the other hand, as the width of the crown reinforcing layer becomes narrow, the heat build-up becomes small, which is favorable in the durability of the tire. Furthermore, when the end of the crown reinforcing layer 2 is located away from and inside the end of the cross belt layers 1, the influence of heat build-up at the crown reinforcing layer to the cross belt layer is small and the occurrence of separation failure is hardly caused at the end of the cross belt layers. In order to totally judge the above effect, therefore, the drum test was carried out by varying the position of the end of the crown reinforcing layer in the tire to obtain results as shown in FIG. 6, wherein an abscissa is a distance from the outer end in widthwise direction of the crown reinforcing layer to the equator of the tire and an ordinate is an index of running distance on an indoor drum test. In this case, the heat build-up is considered in addition to the magnitude of strain at the end of the cross belt layer. As seen from these results, the position of the end of the crown reinforcing layer 2 from the equator of the tire is within a range of 25-47.5% of the maximum width of the actually overlapped region between the cross belt layers 1.

The following examples are given in illustration of the invention and are not intended as limitations thereof.

EXAMPLES 1-4, COMPARATIVE EXAMPLES 1-3

Test tires having a tire size of 11/70 R22.5 were manufactured according to the following Table 1.

TABLE 1

|  |  |  | Comparative Example 1 | Example 1 (FIG. 1a) | Comparative Example 2 (FIG. 1a, exceeding upper limit of a/λ) | Example 2 (FIG. 1a) | Example 3 (FIG. 1b) | Example 4 (FIG. 1c) | Comparative Example 3 (exceeding upper limit of M) |
|---|---|---|---|---|---|---|---|---|---|
| Belt | * | kind of cord |  |  | (1 × 3) × 0.20 − 6 × 0.35 |  |  |  |  |
|  | first | end count (cords/ |  |  | 27 |  |  |  |  |
|  | cross | 50 mm) |  |  |  |  |  |  |  |
|  | belt | angle |  |  | 20° |  |  |  |  |
|  | layer | width (mm) |  |  | 205 |  |  |  |  |
|  | second | kind of cord |  |  | (1 × 3) × 0.20 − 6 × 0.35 |  |  |  |  |
|  | cross | end count (cords/ |  |  | 27 |  |  |  |  |
|  | belt | 50 mm) |  |  |  |  |  |  |  |
|  | layer | angle |  |  | 20° |  |  |  |  |
|  |  | width (mm) |  |  | 190 |  |  |  |  |
| Crown | * | kind of cord |  | (1 × 3) − 9 × 0.23 | monofilament 0.5 d |  |  | (1 × 3) − 9 × 0.23 |  |
| rein- | first |  |  |  |  |  |  |  |  |
| forcing | strip | end count (cords/ |  | 32 | 77 | 32 | 32 |  | 44 |

TABLE 1-continued

|  |  | Comparative Example 1 | Example 1 (FIG. 1a) | Comparative Example 2 (FIG. 1a, exceeding upper limit of a/λ) | Example 2 (FIG. 1a) | Example 3 (FIG. 1b) | Example 4 (FIG. 1c) | Comparative Example 3 (exceeding upper limit of M) |
|---|---|---|---|---|---|---|---|---|
| layer | 50 mm) |  |  |  |  |  |  |  |
|  | angle, a/λ ratio | 10° | 0.05 | 0.063 | 0.05 | 0.05 | 0.05 | 0.05 |
|  | width (mm) |  | 90 |  |  | 140 | 50 × (2) | 90 |
| second | kind of cord |  | (1 × 3) + 9 × 0.23 |  | monofilament 0.5 d | — | — | ** |
| strip | end count (cords/ 50 mm) |  | 32 |  | 77 | — | — |  |
|  | angle, a/λ ratio | 10° | 0.05 | 0.063 | 0.05 | — | — | 0.05 |
|  | width (mm) |  | 90 |  |  | — | — | 90 |
| Ratio M |  | 0.88 | 0.88 | 0.88 | 0.83 | 0.44 | 0.44 | 1.21 |

Note
*order viewed from tread
**(1 × 3) + 9 × 0.23

Then, the durability test on a drum was made with respect to these test tires to obtain results as shown in the following Table 2, wherein the running distance (km) of the tire was represented by an index on the basis that Comparative Example 1 was 100.

For the drum test, the test tire was run on the drum at a speed of 60 km/hr under an internal pressure of 8.0 kgf/cm², to which was applied an initial load of 2500 kg and further a loading of 500 kg was added every 24 hours.

TABLE 2

|  | Comparative Example 1 | Example 1 | Comparative Example 2 | Example 2 | Example 3 | Example 4 |
|---|---|---|---|---|---|---|
| Running distance on drum | 100 | 134 | 106 | 127 | 131 | 133 | inforcing layer

Moreover, in Example 1 and Comparative Example 3, the expansion of tire size over a region ranging from crown center to shoulder was measured by increasing the internal pressure from 0.3 kgf/cm² to 8.0 kgf/cm² to obtain results as shown in FIG. 7.

EXAMPLES 5-7, COMPARATIVE EXAMPLES 4-6

Test tires having a tire size of 11/70 R22.5 were manufactured according to the following Table 3.

TABLE 3

|  |  |  | Comparative Example 4* | Example 5 (FIG. 1a) | Comparative Example 5 (FIG. 1a) | Example 6 (FIG. 1a) | Example 7 (FIG. 1a) | Comparative Example 6 (FIG. 1a) |
|---|---|---|---|---|---|---|---|---|
| Belt | first cross belt layer | kind of cord | (1 × 3) × 0.2 + 6 × 0.35 | (1 × 3) × 0.2 + 6 × 0.35 | (1 × 3) × 0.2 + 6 × 0.35 | (1 × 3) × 0.2 + 6 × 0.35 | (1 × 3) × 0.2 + 6 × 0.35 | (1 × 3) × 0.2 + 6 × 0.35 |
|  |  | end count (cords/ 50 mm) | 27 | 27 | 27 | 27 | 27 | 27 |
|  |  | angle (°) width (mm) | 20° · 210 | 20° · 210 | 20° · 210 | 20° · 210 | 20° · 210 | 20° · 210 |
|  | second cross belt layer | kind of cord | (1 × 3) × 0.2 + 6 × 0.35 | (1 × 3) × 0.2 + 6 × 0.35 | (1 × 3) × 0.2 + 6 × 0.35 | (1 × 3) × 0.2 + 6 × 0.35 | (1 × 3) × 0.2 + 6 × 0.35 | (1 × 3) × 0.2 + 6 × 0.35 |
|  |  | end count (cords/ 50 mm) | 27 | 27 | 27 | 27 | 27 | 27 |
|  |  | angle (°) width (mm) | 20° · 190 | 20° · 190 | 20° · 190 | 20° · 190 | 20° · 190 | 20° · 190 |
| Crown reinforcing layer | first strip | kind of cord | (1 × 3) + 9 × 0.23 | (1 × 3) + 9 × 0.23 | (1 × 3) + 9 × 0.23 | (1 × 3) + 9 × 0.23 | (1 × 3) + 9 × 0.23 | (1 × 3) + 9 × 0.23 |
|  |  | end count (cords/ 50 mm) | 32 | 32 | 32 | 32 | 32 | 32 |
|  |  | width (mm) | 160 (42%) | 160 (42%) | 80 (21%) | 120 (31%) | 180 (47%) | 190 (50%) |
|  | second strip | kind of cord | (1 × 3) + 9 × 0.23 | (1 × 3) + 9 × 0.23 | (1 × 3) + 9 × 0.23 | (1 × 3) + 9 × 0.23 | (1 × 3) + 9 × 0.23 | (1 × 3) + 9 × 0.23 |
|  |  | end count (cords/ 50 mm) | 32 | 32 | 32 | 32 | 32 | 32 |
|  |  | width (mm) | 160 (42%) | 160 (42%) | 80 (21%) | 120 (31%) | 180 (47%) | 190 (50%) |

*The two strips were arranged outside the belt in the radial direction.

(index)
Failure state: separation occurred at end of crown re- / separation occurred at end of cross belt layer Then, the durability test on a drum was made with respect to these test tires in the same manner as in Example 1 to obtain results as shown in the following Table 4, wherein the running distance (km) of the tire was represented by an index on the basis that Comparative Example 6 was 100.

TABLE 4

|  | Comparative Example 4 | Example 5 | Comparative Example 5 | Example 6 | Example 7 | Comparative Example 6 |
|---|---|---|---|---|---|---|
| Running distance on drum (index) | 84 | 124 | 87 | 136 | 118 | 100 |

As mentioned above, according to the invention, the reinforcement of the crown portion in the tire effectively suppressing the separation failure in the cross belt layer can be realized by arranging the strip containing wavy or zigzag cords or filaments as a reinforcing element for the crown reinforcing layer in a proper position without causing the separation of the layer itself and causing troubles in the tire production.

What is claimed is:

1. A pneumatic tire comprising; at least one radial carcass ply toroidally extending between a pair of bead portions and a belt reinforcing a tread on said radial carcass, said belt being comprised of at least two belt layers, each belt layer crossing each other containing cords or filaments as a reinforcing element and crossed with each other at an equator of the tire, at least one crown reinforcing layer disposed between said carcass ply and said cross belt layer comprised of a strip containing wavy or zigzagged cords or filaments arranged substantially in parallel with the equator of the tire as a reinforcing element, and a ratio of amplitude (a) to wavelength ($\lambda$) in the wavy or zigzagged reinforcing element is in the range of 0.015-0.06.

2. The pneumatic tire according to claim 1, wherein said crown reinforcing layer is arranged so that a distance from the outer end in widthwise direction of the strip to the equatorial plane of the tire is within a range of 25-47.5% of a maximum width of an actually overlapped region in the cross belt layers.

3. The pneumatic tire according to claim 1, wherein said crown reinforcing layer is arranged so that a ratio M defined by the following equation is within a range of 0.25-1.0:

$$M = \frac{\sum_{n=1}^{m_W} E_{Wn} \cdot A_{Wn} \cdot N_{Wn}}{\sum_{n=1}^{m_B} E_{Bn} \cdot A_{Bn} \cdot N_{Bn}}$$

wherein $m_W$: total strip number,
$m_B$: total cross belt layer number,
$E_{Wn}$: elastic modulus of reinforcing element in nth strip,
$E_{Bn}$: elastic modulus of reinforcing element in nth cross belt layer,
$A_{Wn}$: sectional area of reinforcing element in nth strip,
$A_{Bn}$: sectional area of reinforcing element in nth cross belt layer,
$N_{Wn}$: end count (cords/50 mm) in nth strip,
$N_{Bn}$: end count (cords/50 mm) in nth cross belt layer.

* * * * *